United States Patent
Hammond et al.

(10) Patent No.: US 9,313,131 B2
(45) Date of Patent: Apr. 12, 2016

(54) HARDWARE IMPLEMENTED ETHERNET MULTIPLE TUPLE FILTER SYSTEM AND METHOD

(71) Applicants: STMICROELECTRONICS, INC.; CISCO TECHNOLOGY, INC.

(72) Inventors: Maynard Darvel Hammond, Lawrenceville, GA (US); Charaf Hanna, Lewisville, TX (US); Zhifang J. Ni, Plano, TX (US); Andrew Graham Whitlow, Lewisville, TX (US); Benjamin Nelson Darby, Huntsville, AL (US); Gale L. Shallow, Johns Creek, GA (US)

(73) Assignees: STMicroelectronics, Inc., Coppell, TX (US); Cisco Technology, Inc., San Jose, CA (US)

( * ) Notice: Subject to any disclaimer, the term of this patent is extended or adjusted under 35 U.S.C. 154(b) by 177 days.

(21) Appl. No.: 14/025,749

(22) Filed: Sep. 12, 2013

(65) Prior Publication Data

US 2015/0071283 A1 Mar. 12, 2015

Related U.S. Application Data

(60) Provisional application No. 61/874,980, filed on Sep. 6, 2013.

(51) Int. Cl.
*H04L 12/28* (2006.01)
*H04L 12/743* (2013.01)
*H04L 12/56* (2006.01)
*H04L 12/761* (2013.01)

(52) U.S. Cl.
CPC ........ *H04L 45/7457* (2013.01); *H04L 12/2801* (2013.01); *H04L 45/16* (2013.01); *H04L 45/741* (2013.01)

(58) Field of Classification Search
CPC .... H04L 45/7457; H04L 45/741; H04L 45/16
See application file for complete search history.

(56) References Cited

U.S. PATENT DOCUMENTS

| | | | |
|---|---|---|---|
| 5,191,656 A | 3/1993 | Forde, III et al. | |
| RE36,469 E | 12/1999 | Wood et al. | |
| 6,466,651 B1 | 10/2002 | Dailey | |
| 6,504,846 B1 | 1/2003 | Yu et al. | |
| 6,654,957 B1 | 11/2003 | Moore et al. | |
| 8,423,529 B1 | 4/2013 | Bloomstein et al. | |
| 2002/0199057 A1* | 12/2002 | Schroeder et al. | 711/108 |
| 2004/0080768 A1 | 4/2004 | Larson | |
| 2004/0085958 A1* | 5/2004 | Oman | 370/389 |
| 2004/0252678 A1 | 12/2004 | Rabenko et al. | |
| 2005/0216667 A1* | 9/2005 | Cabot et al. | 711/118 |

(Continued)

*Primary Examiner* — Robert Wilson
(74) *Attorney, Agent, or Firm* — Seed IP Law Group PLLC

(57) ABSTRACT

A filter in a DOCSIS bridge performs IP Filtering of incoming Ethernet packets in hardware. The filter includes a parser circuit which, in hardware, parses each of the incoming Ethernet packets and then utilizes the parsed information in combination with a content-addressable memory (CAM) that stores filtering information, to filter and route the incoming Ethernet packets. Detailed statistical data may also be generated to provide information on the type of filtering being performed by the DOCSIS bridge.

18 Claims, 6 Drawing Sheets

(56) References Cited

U.S. PATENT DOCUMENTS

| | | |
|---|---|---|
| 2005/0226239 A1 | 10/2005 | Nishida et al. |
| 2006/0184670 A1* | 8/2006 | Beeson et al. ............... 709/224 |
| 2007/0110237 A1 | 5/2007 | Tehranchi et al. |
| 2007/0198763 A1* | 8/2007 | Suzuki et al. ............... 710/316 |
| 2008/0084724 A1* | 4/2008 | Nozieres et al. ............. 365/50 |
| 2008/0184090 A1 | 7/2008 | Kinoshita |
| 2009/0052443 A1* | 2/2009 | Kolenchery et al. ......... 370/389 |
| 2009/0190604 A1 | 7/2009 | Pullen |
| 2009/0232112 A1 | 9/2009 | Trainin et al. |
| 2010/0061393 A1* | 3/2010 | Wong ............................ 370/419 |
| 2010/0098080 A1 | 4/2010 | Stacey |
| 2012/0163167 A1 | 6/2012 | Dade |
| 2013/0094415 A1 | 4/2013 | Ling et al. |
| 2013/0125194 A1 | 5/2013 | Finkelstein et al. |
| 2013/0182623 A1 | 7/2013 | Fan et al. |
| 2013/0243220 A1 | 9/2013 | Watanabe |
| 2014/0064297 A1 | 3/2014 | Hirota |
| 2014/0215144 A1* | 7/2014 | Valency et al. ............... 711/108 |
| 2015/0071283 A1* | 3/2015 | Hammond et al. ........... 370/390 |
| 2015/0071300 A1 | 3/2015 | Shallow et al. |
| 2015/0071302 A1 | 3/2015 | Hanna et al. |

\* cited by examiner

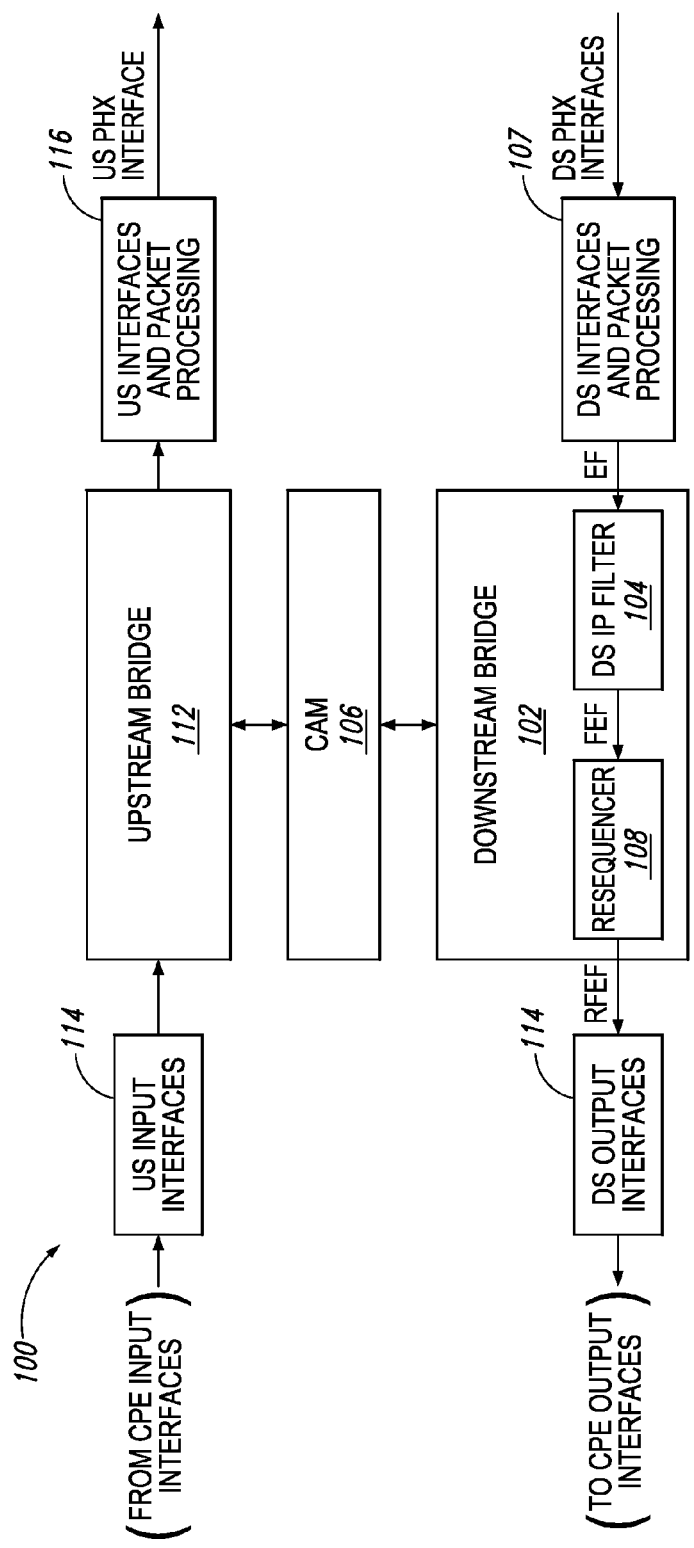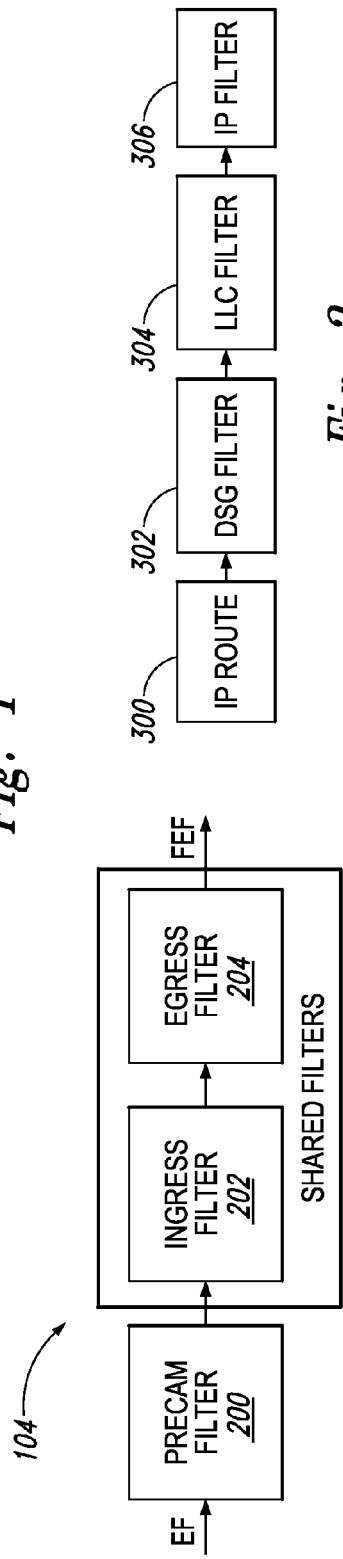

HARDWARE IMPLEMENTED ETHERNET MULTIPLE TUPLE FILTER SYSTEM AND METHOD

PRIORITY DATA

The present application claims priority to U.S. Provisional Patent Application No. 61/874,980, filed Sep. 6, 2013, which application is incorporated herein by reference in its entirety.

RELATED APPLICATION DATA

The present application is related to commonly owned U.S. patent application Ser. No. 14/025,574, filed Sep. 12, 2013, and commonly owned U.S. patent application Ser. No. 14/025,607, filed Sep. 12, 2013), which applications are incorporated herein by reference in their entireties.

TECHNICAL FIELD

The present disclosure relates generally to Data Over Cable Service Interface Specification (DOCSIS) devices and more specifically to filtering of communications packets in such DOCSIS devices.

BACKGROUND

Data Over Cable Service Interface Specification (DOCSIS) is an international telecommunications standard that details various aspects of providing and handling high-speed data transfer using cable TV (CATV) systems that employ coaxial cabling as a medium of transmission. DOCSIS is followed by many cable television operators to provide Internet access over existing proprietary cable system infrastructure. Further, the DOCSIS standard allows for many variations within systems for accomplishing data communications so long as the standard is met. As a result, many devices may employ vastly different mechanisms and algorithms for accomplishing data communication all within the standards of DOCSIS.

Modulated signals containing data being communicated over a cable are received by a DOCSIS device, such as a cable modem (CM), and are thereafter demodulated to provide corresponding Ethernet packets. The cable modem includes an Internet Protocol (IP) filter that is used to filter and route these Ethernet packets to the appropriate components within the cable modem and to devices coupled to the cable modem. Conventionally this filtering is done by a processor contained in the cable modem, where the processor executes software to parse incoming Ethernet packets and thereby obtain the IP and other protocol information contained therein. The processor thereafter applies the desired filtering to the packet based on this information and on filter information stored in the cable modem, and either forwards or drops the packet as appropriate. This filtering needs to be done extremely quickly so that the Ethernet packets are not excessively delayed by the cable modem, but performing this function is extremely computationally intensive for the processor. Improved methods and devices for performing the required IP filtering are accordingly needed.

BRIEF DESCRIPTION OF THE DRAWINGS

FIG. 1 is a functional block diagram of cable bridge communication circuitry according to one embodiment of the subject matter disclosed in the present application.

FIG. 2 is a more detailed functional block diagram of one embodiment of the IP filter of FIG. 1.

FIG. 3 is a diagram showing the components of the ingress filter of FIG. 2 according to one embodiment of the subject matter disclosed in the present application.

DETAILED DESCRIPTION

Figure 4:
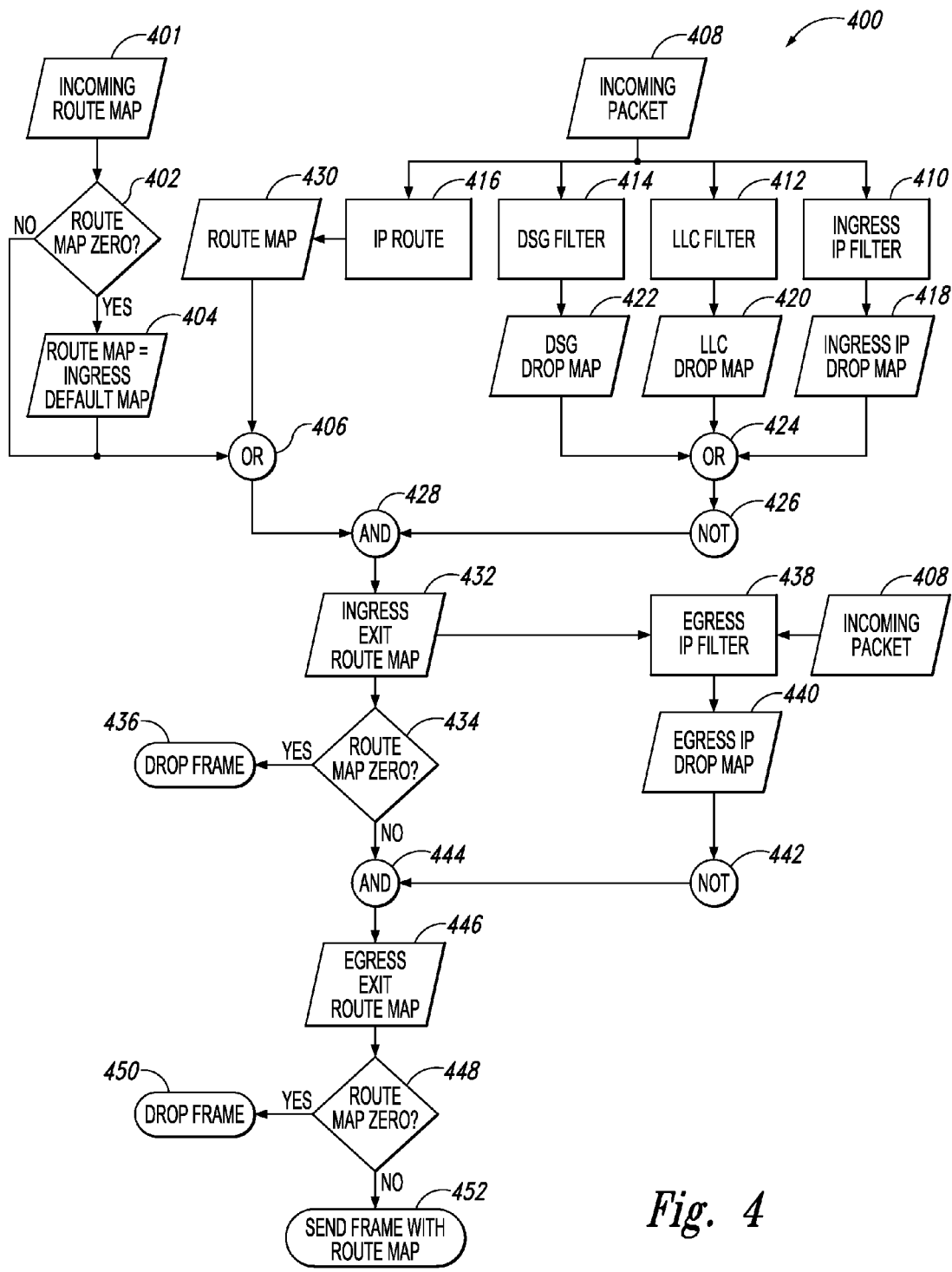
FIG. 4 is a flow diagram showing in more detail the filtering process performed by the downstream IP filter of FIGS. 1 and 2 according to one embodiment of the subject matter disclosed in the present application.

In the following description, certain details are set forth in conjunction with the described embodiments of the subject matter of the present disclosure to provide one skilled in the art with a sufficient understanding of this disclosure. One skilled in the art will appreciate, however, that embodiments of the present subject matter may be practiced without the particular details of the described embodiments. Furthermore, one skilled in the art will appreciate that the example embodiments described do not limit the scope of the subject matter of the present disclosure, and will also understand that various modifications, equivalents, and combinations of the disclosed embodiments and components of such embodiments are within the scope of the subject matter of the present disclosure. Embodiments including fewer than all the components of any of the respective described embodiments may also be within the scope of the subject matter of the present disclosure although not expressly described in detail below. Finally, the operation of well-known components and/or processes has not been shown or described in detail below to avoid unnecessarily obscuring the subject matter of the present disclosure.

FIG. 1 is a functional block diagram of DOCSIS bridge circuitry 100 according to one embodiment of the subject matter disclosed in the present application. The DOCSIS bridge circuitry 100 would typically be contained in a cable modem, but may also be utilized in other DOCSIS type devices as well. The DOCSIS bridge circuitry 100 includes a downstream (DS) bridge 102 including a DS IP filter 104 implemented in hardware circuitry that parses each of the incoming Ethernet frames EF and then utilizes information obtained from this parsing, in combination with the contents of a content-addressable memory (CAM) 106 that stores filtering information, to filter and route the incoming Ethernet frames, as will be described in more detail below. The DS IP filter 104 provides filtering of Ethernet frames EF at "line rate," meaning the rate at which the Ethernet frames are received and also enables the DOCSIS bridge circuitry 100 to perform all desired filtering and routing of received Ethernet frames EF without the use a processor. The Ethernet frames EF include higher level packets contained within or encapsulated in the data or payload portion of the Ethernet frames, as will be appreciated by those skilled in the art. The filtering and routing performed by the DS IP filter 104 is primarily based upon the contents of such packets, but to simplify the following description, the filtering and routing performed by the DS IP filter 104 may interchangeably be said to be filtering and routing of the packets or filtering and routing of the Ethernet frames.

As will be appreciated by those skilled in the art, the IP protocol suite is a set of communication protocols used for communication over the Internet and other networks, and is commonly referred to as "TCP/IP" since the two most important protocols of the suite are the Transmission Control Protocol (TCP) and the Internet Protocol (IP). The DS IP filter 104 is so named because it functions to process and filter packets of multiple protocols in the IP protocol suite, including the IP protocol, TCP protocol, user datagram protocol (UDP), Subnetwork Access Protocol (SNAP), and others, as will be described in more detail below.

The downstream (DS) portion of the DOCSIS bridge circuitry 100 includes downstream interfaces and packet processing circuitry 107 that interfaces with downstream physical layer (PHY) interfaces over which modulated radio frequency (RF) signals containing the Ethernet frames EF being communicated are received. These signals are demodulated through the DS PHY interfaces and the packet processing circuitry 107 interfaces with these PHY interfaces to receive the demodulated signals. The packet processing circuitry 107 processes the demodulated signals from the DS PHY interfaces to generate the received Ethernet frames EF that are input to the DS IP filter 104.

In addition, the packet processing circuitry 107 appends a special packet header SPH to each Ethernet frame EF, with bits or fields in the special packet header thereafter being modified by the DS IP filter 104 as the Ethernet frame is processed by the filter, as will be described in more detail below. Thus, in FIG. 1 the Ethernet frames EF that are input to the DS IP filter 104 each include a corresponding special packet header SPH. One of the fields in the SPH header is a route map field that indicates destinations of the incoming downstream Ethernet frame EF. For example, the packet processing circuitry 107 may determine that the received Ethernet frame EF is for a particular channel of data that is being communicated and set values in the route map field to indicate this channel as the destination for the frame. Where no routing information (i.e., information indicating the destination of the Ethernet frame EF) can be determined by the packet processing circuitry, the circuitry inserts all zeros for the route map field in the special packet header SPH, indicating there are no destinations for the incoming frame. This may result in the frame being "dropped" by the DS IP filter 104 but the filter may also set values in the route map field to thereby add or provide destinations for the Ethernet frame EF, in which case the all zero route map field will be modified accordingly and the frame thereafter routed accordingly, as will be described in more detail below.

The DS IP filter 104 parses the received Ethernet frames EF to obtain parsed information about the contents of the frame and utilizes this parsed information and the contents of the specialized content-addressable memory (CAM) 106, which define the filtering operations to be performed, to filter and route the incoming Ethernet frames EF. As will be understood by those skilled in the art, a CAM, such as the CAM 106, is a memory in which a data word (i.e., tuples or selected fields from the incoming Ethernet frames EF) are supplied to the CAM 106 and the CAM thereafter searches memory storage locations of the CAM to determine whether the supplied data word is found stored anywhere in the memory storage locations of the CAM. If the data word is found stored in the CAM 106, the CAM returns a hit for those locations that match. Filtering data indicating the type of filtering to be performed on the Ethernet frame is returned from traditional memory or registers for the EF based on which entries in the CAM had a hit. Thus, this specialized CAM memory is unlike standard memories like random access memory (RAM) in which a memory address is supplied to the RAM and the RAM thereafter returns the data word that is stored in the RAM at that address or traditional CAMs that just return hit information. The DS IP filter 104 modifies bits or fields in the special packet header SPH of each Ethernet frame EF responsive to the retrieved filtering data to thereby generate a filtered Ethernet frame FEF. The special packet header SPH of each filtered Ethernet frame FEF is utilized by components in the cable modem and external to the cable modem that subsequently receive these filtered Ethernet frames FEF to take a corresponding action on the received frame based, in part, on the contents of the special packet header.

A resequencer 108 receives the filtered Ethernet frames FEF from the DS IP filter 104 and reorders or resequences the frames into the proper order or sequence since the frames may be received out of sequence, as will be appreciated by those skilled in the art. For a variety of reasons, such as differences in the type of modulation being utilized to communicate data over each channel or the quality of service (QOS) of a channel, the Ethernet frames EF may be received out of order or sequence. If the received Ethernet frames EF are received out of sequence, the filtered Ethernet frames FEF from the DS IP filter 104 will similarly be out of sequence. Thus, the resequencer 108 examines the FEF frames and reorders or resequences these frames so that they are in the proper sequence, with these resequenced filtered Ethernet frames FEF being designated RFEF in FIG. 1. The RFEF frames are then provided to downstream output interfaces 110 which, in turn, communicate these RFEF frames through customer premises interfaces to customer premises equipment (CPE) coupled to these interfaces. For example, CPE such as personal computers or televisions can be coupled through suitable DS output interfaces 110 such as Ethernet ports and HDMI ports to receive and process the RFEF frames, the frames may be provided to a processor (not shown) on the integrated circuit containing the bridge circuitry 100 for further processing.

The DOCSIS bridge circuitry 100 further includes upstream (US) circuitry that functions in a manner analogous to that just described for the downstream components. More specifically, the bridge circuitry 100 includes an upstream bridge 112 including an upstream IP filter (not shown) that operates in a manner analogous that described above for the DS IP filter 104. The customer premises equipment CPE supply Ethernet packets to US input interfaces 114 which operate in manner analogous to the DS output interfaces to process these outgoing or upstream Ethernet frames EF and provide them to the upstream bridge 112. The upstream bridge 112 includes an US IP filter, as previously mentioned, that also utilizes the contents of the CAM 106 to filter and route the outgoing or upstream Ethernet frames EF. The filter upstream Ethernet packets from the upstream bridge 112 are provided to US interfaces and packet processing circuitry 116 that operates in a manner analogous to the DS interfaces and packet processing circuitry 107 and provides filtered upstream Ethernet frames EF to the upstream PHY interfaces which, in turn, utilize these frames to modulate RF carrier signals and communicates these modulated carrier signals to upstream components in the system, such as a cable modem termination system (CMTS) coupled to number of cable modems.

In one embodiment, all the bridge circuitry 100 is formed in a single chip or integrated circuit. Thus, in one embodiment the bridge circuitry 100 may be system on a chip. In other embodiments the CAM 106 may be formed on a separate chip from the other circuitry in the bridge circuitry 100. In some embodiments, the DS IP filter 104 may operate in combination with a processor (not shown in FIG. 1) to perform the required filtering of Ethernet packets. In such an embodiment, when the DS IP filter 104 determines an Ethernet packet EP contains a packet having a new or little used type of protocol, the DS IP filter provides the packet to the processor for parsing and filtering in a conventional manner. The processor may not be able to process such packets at line rate but this embodiment would allow the DS bridge 102 and DS IP filter 104 to be utilized in systems where a small percentage of the overall number of Ethernet packets EP include such new or rarely-used type of protocol packets instead of simply ignoring or failing to process such packets. An upstream IP filter (not shown) in the upstream bridge 112 and the DS IP filter 104 in the downstream bridge 102 both utilize or "share" the same CAM 106 and thus it is termed a shared CAM. In addition, the same hardware circuitry in the bridge 100 may implement the upstream IP filter and the DS IP filter 104. The sharing of the CAM 106 and the hardware circuitry for both the upstream and downstream IP filters reduces the size or area occupied by this circuitry and the overall cost of the bridge 100.

FIG. 2 is a more detailed functional block diagram of one embodiment of the US IP filter 104 of FIG. 1. The US IP filter 104 includes a pre-CAM filter 200 that receives the incoming Ethernet frames EF and performs high-level filtering on these incoming frames. More specifically, the pre-CAM filter 200 performs high-level filtering by checking several commonly used fields in the Ethernet packet EF and compares these fields to specified values for these fields. In one embodiment, the pre-CAM filter 200 is another small CAM storing the filtering information for these commonly used fields in the Ethernet packet EF to thereby perform the desired high-level filtering.

In one embodiment, the pre-CAM filter 200 checks the selected fields of the Ethernet packet EF against eight entries in the specialized CAM in a single clock cycle of the downstream bride circuitry 102. In this embodiment, the pre-CAM filter 200 examines the Ethernet frames EF Frames entering the downstream IP filter 104 using an eight-entry filter. This examination of the Ethernet frames EF by the pre-filter CAM only detects or examines two fields in the Ethernet frames: 1) the Ethernet type field indicating the protocol encapsulated in a payload portion of the Ethernet frame; and 2) a two-bit frame type indicating the type of Ethernet frame, such as an Ethernet II, SNAP or IEEE 802.3 frame. These fields in the Ethernet frame EF are extracted or determined by a parser that is part of the DS IP filter 104, as will be described in more detail below.

If the pre-CAM filter 200 has a hit (i.e., the filter finds the value contained in the extracted field in the eight-entry filter) then the Ethernet frame EF can be dropped, or specific filtering and routing maps are applied to the frame. On a miss (i.e., the filter does not find the value contained in the extracted field in the eight-entry filter) the extracted field values are passed onto the other filters in the DS IP filter, as will be described in more detail below. Table 1 below illustrates one embodiment of the downstream pre-CAM filter 200.

TABLE 1

CAM Fields for Pre-Cam Filter

| Field Name | Number of Bits | Number of Mask Bits | Description/Notes |
|---|---|---|---|
| Negate | 1 | — | Invert hit status. This bit is used to build entries where the incoming frame is updated if it doesn't match some criteria.<br>1'b0: Normal operation.<br>1'b1: Invert hit status. |
| Ethernet Type | 16 | 1 | The 16-bit Ethernet Type field from the incoming EF frame |
| Frame type | 2 | 1 | Frame type<br>2'b00: Ethernet II/DIX frame ( DIX is another name for Ethernet II framing where DIX is so named because Digital Equipment Corporation (DEC), Intel and Xerox primarily designed this frame structure)<br>Ethernet Header Ether_type > 0x5DC<br>AND<br>Ethernet Header Ether_type != 0x8137<br>2;b01: 802.3 with SNAP header and Data Unit NOT IPX<br>Ethernet Header Ether_type < 0x5DD<br>AND<br>LLC = (0xAA, 0xAA, 0x03)<br>AND<br>Data Unit Ether_type != 0x8137<br>2'b10: 802.2 and not SNAP and Data Unit NOT IPX<br>Ethernet Header Ether_type < 0x5DD<br>AND<br>LLC != (0xAA, 0xAA, 0x03)<br>AND<br>LLC != (0xE0, 0xE0, 0x03)<br>AND<br>LLC != (0xFF, 0xFF)<br>2'b11: none of the above (IPX, etc.) |
| Drop | 1 | — | Drop this frame.<br>0 = Keep frame<br>1 = Drop frame |
| Egress | 1 | 1 | Enable Egress filtering.<br>0 = Don't do egress filtering<br>1 = Do egress filtering. |
| Add Route | 1 | 1 | Enable IP route function to incoming frame<br>0 = Do not allow routing to be augmented<br>1 = Allow routing to be augmented. |
| IP filter | 1 | 1 | Enable IP filtering on incoming frame<br>0 = Do not do IP filtering<br>1 = Do IP filtering |
| LLC filter | 1 | 1 | Enable LLC filtering on incoming frame<br>0 = Do not do LLC filtering<br>1 = Do LLC filtering |
| DSG filter | 1 | 1 | Enable DSG filtering on incoming frame<br>0 = Do not do DSG filtering<br>1 = Do DSG filtering |
| Route Map | 17 | 17 | Input route map for the frame. |

As previously mentioned, the packet processing circuitry 107 (FIG. 1) appends a special packet header SPH to each Ethernet frame EF, with bits or fields in the special packet header thereafter being modified by the DS IP filter 104. The values in Table 1 represent values that are modified in the special packet header SPH of an Ethernet frame EF. For example, the different types of routing and filtering that may be performed on the Ethernet frame EF (i.e., the packet encapsulated in this frame) are defined as seen Table 1, with values in the special packet header SPH being set or not to allow or disallow such subsequent routing and filtering functions to be performed on the frame. Some of the entries in Table 1 may be described in more detail below.

In the embodiment of the pre-CAM filter 200 illustrated by Table 1, either Ethernet type, frame type, or both may be enabled for the pre-CAM filter. If both are enabled, both must match for a hit to occur. The drop output is accumulative, meaning if multiple entries have a hit and one indicates the Ethernet frame EF is to be dropped, then the frame will be dropped. The filtering type output flags and routing map are set to the first entry that has a hit in Table 1, and if both entry 0 and entry 3 hit the values from entry 0 are used. The pre-CAM filter 200 includes masks so that a hit will only update the desired fields. For example, a hit on an entry may be used to set only the IP filtering flag. A negate bit is provided to enable hits if the entering frame does not match the programmed data, and provides flexibility to include other types of actions or filtering in this situation.

The Ethernet frame EF as filtered by the pre-CAM filter 200 is provided to an Ingress filter 202 that performs four types of filtering on the frame; 1) DOCSIS Set-top gateway (DSG) filtering; 2) Link Level Control (LLC) filtering; 3) IP filtering; and 4) IP routing filtering. FIG. 3 diagrammatically illustrates the four components of the ingress filter 202 of FIG. 2, namely an IP routing filter 300, DSG filter 302, LLC filter 304, and ingress IP filter 306 that collectively form the ingress filter. Each of the filters 300-306 performs the corresponding filtering just mentioned. More specifically, the IP Routing filter 300 functions not as a filter that drops Ethernet frames EF (i.e., packets being carried by such Ethernet frames) but instead functions to identify specific packets among the incoming downstream Ethernet frames EF and to forward these packets to certain destination ports. The IP routing filter 300 classifies the packets based on information ranges from the Data Link Layer (level 2 or L2) to the Transport Layer (level 4 or L4) in the Open System Interconnection (OSI) model, which is a model characterizing the functions of a communication system by partitioning the system into functional layers, as will be appreciated by those skilled in the art.

The DSG filter 302 functions to classify the packets encapsulated by the Ethernet frames EF into different DSG data streams whose information will be forwarded to and used by a Set-Top-Box application (not shown in FIG. 2). The DSG filtering classifies the packets based on information from the Data Link Layer (L2) to the Transport Layer (L4), where these layers correspond to the functional layers in the OSI model. When there is a match (i.e., a hit), meaning the data word formed by the values from the fields of the parsed Ethernet frame EF (i.e., values in the packet contained therein) matches values in the CAM 106 (FIG. 1), the actions programmed (i.e., accept the frame or drop the frame) are performed on the routing map in the SPH header that is forwarded as part of the filtered Ethernet frame FEF.

The LLC filter 304 filters the Ethernet frames EF based on the Data Link Layer (L2) information, such as the Ethertype or length. The Ethertype fields in an Ethernet frame EF indicate the type of the packet encapsulated (i.e., IPv4, IPv6, etc.) in the payload portion of the Ethernet frame while for IEEE 802.3 frames this same field indicates the length of the payload, as will be appreciated by those skilled in the art. In addition, the LLC filter 304 may be used to limit forwarding of the Ethernet frame EF to the packet corresponding to a restricted set of Data Link Layer (L2) protocols for the frame.

If the LLC filter 304 identifies a match (i.e., a hit in the CAM 106) then the packet (i.e., Ethernet frame EF) can be dropped or kept, and a default action may be taken when there is a miss by the LLC filter.

The ingress IP filter 306 IP filters incoming downstream Ethernet frames EF based on the Network Layer (L3) and the Transport Layer (L4) protocol information encapsulated in the payload of the Ethernet frames, such as source and destination IP addresses, transport-layer protocols, and source and destination TCP/UDP port numbers. If the ingress IP filter 306 determines there is a hit, the Ethernet frame EF or packet contained therein can be dropped or kept. The ingress IP filter 306 may take a default action when the ingress IP filter determines there is a miss for the packet being processed.

In the ingress filter 202, the DSG filter 302, LLC filter 304, and ingress IP filter 306 filter incoming packets to remove or drop routing from the incoming packet or Ethernet frame EF, while the IP routing filter 200 functions to add routing information to the incoming packet or Ethernet frame. The ingress filter 202 gives precedence to the "drop" functions of the DSG, LLC, and IP filters 302-306, with routes being added to the Ethernet frame EF via the IP routing filter 300 only if none of the other filters 302-306 indicates the frame should be dropped or the route destination to add should not be dropped.

Furthermore, it should be noted that each of the four filters 300-306 of the ingress filter 202 operate independently, with the results of all four filters being combined to produce the final filtered output frame from the ingress filter. The Ethernet frames EF are input to the ingress filter 200 containing the special packet header SPH as described above, and as seen and discussed above with reference to Table 1 the special packet header indicates which of the filters 300-306 is to be run or applied to the Ethernet frame. Multiple filters or all filters can be run. In one embodiment, each of the four ingress filters 300-306 may utilize any of the filtering fields of the filtering data contained in the CAM 106, although typically each filter would utilize specific fields to perform the intended function of that filter.

Returning now to FIG. 2, the DS IP filter 104 further includes an egress filter 204 that receives the filtered Ethernet frames EF from the ingress filter 202, which filters the incoming downstream Ethernet frames after processing or filtering by the pre-CAM filter 200 as just described above. The egress filter 204 further filters these Ethernet frames EF and modifies the special packet header SPH accordingly. In operation, the egress filter 204 further filters the Ethernet frames EF based on the routing map exiting the ingress filter 202 as well as the EF data provided to the ingress filter.

Each filter is enabled by setting the appropriate filtering bit in the SPH. DSG, LLC, IP filter, and IP Route functions are all enabled via separate bits. The egress filter 204 performs IP filtering of the Ethernet frames EF from the ingress filter 202 and operates on any frame having an "egress bit" set in the SPH header of the frame. See Table 1 which indicates for the pre-CAM filter 200 that if the egress bit is set to zero that the egress filter 204 will do no further filtering of the Ethernet frame EF but will simply output it as the filtered Ethernet frame FEF (see FIG. 1). Conversely, if the egress bit is set to 1, the egress filter 204 will filter the Ethernet frame EF from the ingress filter 202.

As Table 1 illustrates for the pre-CAM filter 200, similar tables exist for the ingress filter 202 and egress filter 204 of FIG. 2. Tables 2 below illustrates one embodiment of a portion of the CAM 106 for the downstream ingress filter 202.

TABLE 2

CAM Fields for Ingress Filter

| Field Name | Number of Bits | Number of Mask Bits | Description/Notes |
|---|---|---|---|
| Valid | 1 | — | This filter has valid data. Use it! |
| Continue | 1 | — | Continue through filter (stop filtering if not set) |
| Negate | 1 | — | Invert hit status. This bit is used to build entries where the incoming frame is updated if it doesn't match some criteria.<br>1'b0: Normal operation.<br>1'b1: Invert hit status. |
| Filter Control | 4 | — | {DSG, LLC, IP filter, IP route} |
| Packet Entry Port (Rx Channel or Port Source ID) | 32 | 4 | Downstream: Rx channel. Upstream: Source ID. 2 bit masks field. The first mask bit masks whether or not the entry field is used. The second mask bit masks the direction bit. A bit is used to negate the function and a control bit specifies Upstream or Downstream. Filter looks at the incoming port. If the entry port corresponds to one of the programmed bits, this field is considered to have a hit. The negate bit can be used to modify the function to be one where the incoming port does not match one of the programmed sources to produce a hit. |
| DSID Index | 6 | 1 | MSB is valid |
| L2VPN | 1 | 1 | Layer 2 VPN flag |
| MAC destination | 48 | 48 | Ethernet MAC destination field. |
| Frame type | 2 | 2 | Frame type<br>2'b00: Ethernet II/DIX frame<br>Ethernet Header Ether_type > 0x5DC<br>AND<br>Ethernet Header Ether_type != 0x8137<br>2;b01: 802.3 with SNAP header and Data Unit NOT IPX<br>Ethernet Header Ether_type < 0x5DD<br>AND<br>LLC = (0xAA, 0xAA, 0x03)<br>AND<br>Data Unit Ether_type != 0x8137<br>2'b10: 802.2 and not SNAP and Data Unit NOT IPX<br>Ethernet Header Ether_type < 0x5DD<br>AND<br>LLC != (0xAA, 0xAA, 0x03)<br>AND<br>LLC != (0xE0, 0xE0, 0x03)<br>AND<br>LLC != (0xFF, 0xFF)<br>2'b11: none of the above (IPX, etc.)<br>Two mask bits are used. If the whole field is needed both mask bits need to be 1. If you only need to distinguish between the first two cases and the last two, the mask bits would be set to 2'b10. |
| Fragment | 1 | 1 | A one indicates Fragmented frame without L4 header (offset is not 0) |
| VLAN VID | 12 | 1 | The 12-bit field consists the 802.1Q VID (bits[11:0]). The mask controls comparison of the VID. |
| VLAN PCP Start | 3 | 1 | 3-bit start value of the 802.1Q VLAN PCP field. These bits correspond to bits [15:13] of the VLAN field. Comparison of the PCP field is enabled by a mask bit. This mask bit must be set to a 1'b1 for PCP comparison to occur. If a VLAN field is not present in the frame, having this bit set will cause the filter to fail. |
| VLAN PCP End | 3 | — | 3-bit end value of the 802.1Q VLAN PCP field. |
| Ether Type | 16 | 1 | The IP Type field is maskable by a single bit. |
| Version | 4 | 1 | Type of frame.<br>4'b0001 = ICMP/ICMPv6<br>4'b0010 = TCP/UDP<br>4'b0000 = IP but not ICMP/ICMPv6/TCP/UDP<br>4'b1000 = Not IP |

TABLE 2-continued

CAM Fields for Ingress Filter

| Field Name | Number of Bits | Number of Mask Bits | Description/Notes |
|---|---|---|---|
| IP TOS | 8 | 8 | Type of service |
| IP Protocol | 8 | 1 | Protocol field for Ethernet II and IEEE SNAP frames. Maskable by a single bit. |
| IP Destination Address | 32 | 32 | IP destination address for Ethernet II and IEEE SNAP frames. |
| IP Source Address | 32 | 32 | IP source address for Ethernet II and IEEE SNAP frames. LLC for 802.3 with 802.2 header. For LLC: Bits[31:24]: DSAP Bits[23:16]: SSAP Bits[15:8]: Control |
| Destination Port Start ICMP Code Start | 16 | — | Destination port for Ethernet II and IEEE SNAP TCP/UDP frames. Code for ICMP/ICMPv6/IGMP frames (lower 8 bits). With start and end given, you turn this off by programming start to 0x0, and end to 0xFFFF. |
| Destination Port End ICMP Code End | 16 | — | |
| Source Port Start ICMP Type Start | 16 | — | Source port for Ethernet II and IEEE SNAP TCP/UDP frames. Type for ICMP/ICMPv6/IGMP frames (lower 8 bits). With start and end given, you turn this off by programming start to 0x0, and end to 0xFFFF. |
| Source Port End ICMP Type End | 16 | — | |
| Route/Drop | 17 | — | Port(s) to route to or drop from |

Tables 3 below illustrates one embodiment of a portion of the CAM 106 for the downstream egress filter 204.

TABLE 3

CAM Fields for the Egress Filter

| Field Name | Number of Bits | Number of Mask Bits | Description/Notes |
|---|---|---|---|
| Valid | 1 | — | This filter has valid data. Use it! |
| Continue | 1 | — | Continue through filter (stop filtering if not set) |
| Negate | 1 | — | Invert hit status. This bit is used to build entries where the incoming frame is updated if it doesn't match some criteria. 1'b0: Normal operation. 1'b1: Invert hit status. |
| L2VPN | 1 | 1 | Layer 2 VPN flag |
| Routing | 17 | 17 | Routing destination. Mask bits for each individual destination |
| MAC destination | 48 | 48 | Ethernet MAC destination field. |
| Frame type | 2 | 2 | Frame type 2'b00: Ethernet II/DIX frame Ethernet Header Ether_type > 0x5DC AND Ethernet Header Ether_type != 0x8137 2;b01: 802.3 with SNAP header and Data Unit NOT IPX Ethernet Header Ether_type < 0x5DD AND LLC = (0xAA, 0xAA, 0x03) AND Data Unit Ether_type != 0x8137 2'b10: 802.2 and not SNAP and Data Unit NOT IPX Ethernet Header Ether_type < 0x5DD AND LLC != (0xAA, 0xAA, 0x03) AND LLC != (0xE0, 0xE0, 0x03) AND LLC != (0xFF, 0xFF) 2'b11: none of the above (IPX, etc.) Two mask bits are used. If the whole field is needed both mask bits need to be 1. If you only need to distinguish between the first two cases and the last two, the mask bits could be set to 2'b10. |
| Fragmented | 1 | 1 | A one indicates Fragmented frame without L4 header (offset is not 0) |
| VLAN VID | 12 | 1 | The 12-bit field consists the 802.1Q VID (bits[11:0]). The mask controls comparison of the VID. |
| VLAN PCP Start | 3 | 1 | 3-bit start value of the 802.1Q VLAN PCP field. These bits correspond to bits [15:13] of the VLAN field. Comparison of the PCP field is enabled by a mask bit. This mask bit must be set to a 1'b1 for PCP comparison to occur. If a VLAN field is not present in the frame, having this bit set will cause the filter to fail. |
| VLAN PCP End | 3 | — | 3-bit end value of the 802.1Q VLAN PCP field. |
| Ether Type | 16 | 1 | The IP Type field is maskable by a single bit. |

Tables 1, 2 and 3 illustrate respective portions or sections of the CAM 106 that implement the pre-CAM filter 200, ingress filter 202 and egress filter 204, respectively. These fields of each filter 200-204 are programmable through programming of the CAM 106, and thus the specific characteristics of each filter may be easily modified through reprogramming of the CAM.

FIG. 4 is a flow diagram showing in more detail a filtering process 400 performed by the downstream IP filter 104 of FIGS. 1 and 2 according to one embodiment of the subject matter disclosed in the present application. In the flow diagram of FIG. 4, initially an incoming Ethernet frame EF is received from the packet processing circuitry 107 and includes the special packet header SPH as previously described. Moreover, the special packet header SPH includes the route map field as also described above. In the filter process 400 of FIG. 4 the route map contained in the route map field is received in step 401 to start the process and the process goes to step 402 and determines whether the route map contains all zeros. Recall, as mentioned above a route map of all zeros indicates no destinations for the incoming Ethernet frame EF. When the route map contains all zeros the determination step 402 is positive and the process proceeds to step 404 and assigns a default ingress route map to the Ethernet frame EF. This default ingress route map may also be all zeros or may be programmed to desired default routing values.

From step 404 the process then proceeds to a logical OR operation in step 406. In addition, when the route map of the incoming Ethernet frame EF is not all zeros the determination in step 402 in the process proceeds directly from step 402 to the logical OR operation in step 406. The logical OR operation of step 406 will be described in more detail below. As illustrated in FIG. 4, an incoming packet's tuples, meaning the extracted data portions of an incoming Ethernet frame EF (i.e., the packet tuples is encapsulated in the incoming Ethernet frame as mentioned above) is illustrated as being received and input to the filtering process in step 408. This incoming packet tuples are then applied to each of the ingress filters previously described with reference to FIG. 3. More specifically, the incoming packet's tuples are applied to the ingress IP filter 306 in step 410, the LLC filter 304 in step 412, the DSG filter 302 in step 414, and the IP routing filter 300 in step 416. This filtering of the incoming packet's tuples occurs in parallel since the DS IP filter 104 (FIGS. 1 and 2) which contains each of the filters 300-306 that perform the filtering of steps 410-416, is a hardware circuit that allows the filtering of incoming packet's tuples to be performed at line rate, as previously mentioned above.

In the filtering process 400 of FIG. 4 each of the ingress IP filtering in step 410, LLC filtering in step 412, and DSG filtering in step 414 may be viewed as generating an ingress IP drop map in step 418, LLC drop map in step 420 and DSG drop map in step 422, respectively, with the drop maps collectively being applied to the SPH header to perform the desired filtering of the incoming packet, as will now be described in more detail. As previously mentioned, ingress IP, LLC and DSG filtering functions of steps 410-414 are accumulative such that if one of these filtering functions indicates the incoming packet is to be dropped from a destination, then the packet will be dropped from that destination. This functionality is represented through the logical OR function in step 424 where each of the drop maps in steps 418-422 may be viewed as a mask that is applied to the special packet header SPH indicating which values in the special packet header are to be dropped. Thus, the logical OR function of step 424 effectively outputs a corresponding overall drop map that will be applied to set values in the SPH header and thereby apply the desired filtering.

The overall drop map generated by the logical OR function in step 424 thus may be viewed as a bitmap or mask that will be applied to the SPH header to perform the desired filtering where the mask includes a logical 1 for each bit or destination value in the SPH header that is to be dropped. This overall drop map is then inverted or complemented through the logical NOT function in step 426 to thereby change each value in the overall drop map indicating a destination value in the SPH header is to be dropped to a logical 0. This is done so that through a logical AND operation in step 428 this overall drop map is applied to the route map resulting from the logical OR operation in step 406, as will be described in more detail below.

Before discussing the output from the logical OR function in step 406 the IP routing performed by the IP routing filter 300 (FIG. 3) in step 416 will now be described. As mentioned above, this IP routing performed in step 416 is different than the filtering or "drop" functionality of the filtering in steps 410-414. Recall, this IP routing does not result in destinations being dropped or filtered but may add destinations for the incoming packet. Accordingly, this IP routing in step 416 generates a routing map as represented by step 430. This routing map in step 430 thus indicates additional destinations to be added to the route map contained in the SPH header of the incoming packet so that the packet will be sent to these additional destinations. Accordingly, the logical OR operation in step 406 represents the combination of either the incoming route map (when the determination in step 402 is negative) or the ingress default route map from step 404 (when the determination in step 402 is positive) with the IP route map generated by the IP routing filtering of the IP routing filter 300 (FIG. 3) in step 430. The logical OR operation of step 406 is utilized to represent this combination for the same reason as previously described with reference to the logical OR operation of step 424, namely the incoming route map or ingress default route map may be viewed as a bitmap including logical 1 values for destinations that are to receive the incoming packet, and the same is true for the IP routing route map of step 430 such that through the logical OR operation of step 406 these two route maps are combined.

Returning now to the logical AND operation of step 428, this operation represents the filtering of the combined route map from the logical OR operation in step 406. The combined route map from the logical OR operation of step 406 represents all destinations that are to receive the incoming packet based on the added destinations from step 430 and either the incoming route map or the ingress default route map for the packet. Through the logical AND operation of step 428 the overall drop map generated by the logical NOT operation in step 426 as generated from the filtering operations in steps 410-414 is combined with the combined route map from the logical OR operation of step 406 through a logical AND function to thereby remove destinations in the combined route map as defined by the overall drop map from step 426. Accordingly, the result of the logical AND operation in step 428 is the route map for the incoming packet as determined by the ingress filter 202 (FIG. 2), and is designated as the ingress exit route map in step 432 of FIG. 4.

From step 432, the filtering process goes to step 434 and the ingress filter 202 (FIG. 2) determines whether the ingress exit route map has all zeros, indicating no destinations for the incoming packet. When the determination in step 434 is positive, the process goes to step 436 and the incoming packet is dropped since there are no destinations designated to receive the packet. Note the ingress exit route map is also supplied to the egress filter 204 (FIG. 2) and when step 434 indicates the ingress exit route map includes destinations (i.e., is not all zeros) then the ingress exit route map from step 432 may be further modified by the egress filter 204 (FIG. 2), as will now be described in more detail with reference to the lower portion of the flow diagram of FIG. 4.

The ingress exit route map is supplied to the egress IP filter egress filter 204 (FIG. 2), which is indicated as being supplied for egress IP filtering in step 438. Recall, the egress filter 204 performs IP filtering of the incoming packet as discussed above, and this IP filtering is represented in step 438 that receives the incoming packet in step 408. In step 438, the egress IP filter 204 (FIG. 2) filters the incoming packet's tuples from step 408 to thereby adjust the destinations of the incoming packet. As described above with reference to the filtering steps 410-414, this filtering in step 438 may be viewed as the egress IP filter 204 generating egress IP drop map in step 440, where the egress IP drop map is analogous to the ingress IP drop map of step 418. The egress IP filter 204 has the same tuple data as the ingress filter 202 but also has the route map coming from the ingress filter 432 to base its filtering on.

This egress IP drop map produced in 438 is shown in 440. This drop map is then inverted or complemented through the logical NOT function in step 442 to thereby change each value in the egress IP drop map indicating a destination to drop in the SPH header to a logical 0. This is done so that through a logical AND operation in step 444 drop destinations are removed from the final route map 446. This egress IP drop map is applied to the ingress exit route map from step 434 (i.e., generated by the ingress filter 202 of FIG. 2) to thereby adjust the destinations of the incoming packet. The egress IP drop map only can result in some of the destinations of the ingress exit rout map being dropped, no destinations are added through the egress IP drop map, as mentioned above when discussing the egress filter 204 (FIG. 2). The result of the logical AND operation in step 444 is an egress exit route map as shown in step 446. The egress exit route map is written back to the special packet header SPH It defines the destinations of the incoming packet. In step 448 filtering process 400 determines whether the final generated egress exit route map from step 446 contains all zeros, indicating no destinations for the incoming packet. When the determination in step 448 is positive, the process goes step 450 and the incoming packet is dropped since there are no destinations to which the packet is to be sent.

When the determination step 448 is negative, the routing information in the SPH header corresponding to the egress exit route map indicates that the packet is to be sent on to corresponding destinations. Accordingly, the incoming packet is forwarded along with the SPH header, which includes the egress exit route map, as the filtered Ethernet frame FEF (FIG. 1) to the resequencing circuit 108 (FIG. 1) for subsequent processing. If the frame was dropped, this information is also sent to the resequencing circuit 108 so that it knows that frame will not be coming.

Figure 5:
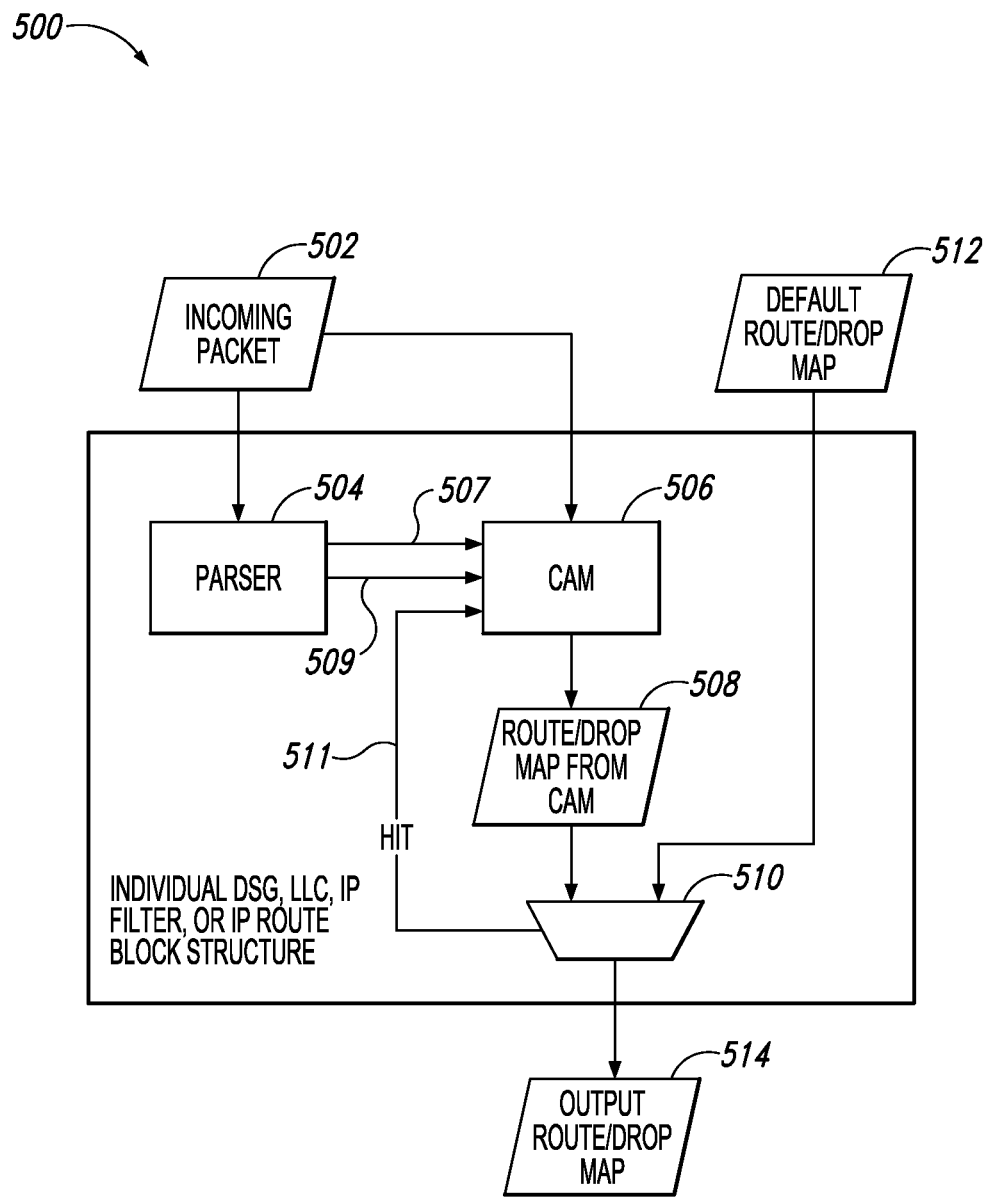
FIG. 5 is a functional block and flow diagram showing in more detail the operation of each of the filter blocks contained in the filtering process of FIG. 4 according to one embodiment of the subject matter disclosed in the present application.

FIG. 5 is a functional block and flow diagram showing in more detail the operation of each of the filter blocks contained in the filtering process 400 of FIG. 4 according to one embodiment of the subject matter disclosed in the present application. More specifically, the flow diagram of FIG. 5 illustrates in more detail the generation of the ingress IP, LLC, and DSG drop maps in steps 418-422 from the corresponding filtering operations in steps 410-414. FIG. 5 also illustrates in more detail the generation of the IP route map in step 430 by the IP routing filtering operation in step 416. More specifically, FIG. 5 illustrates in more detail a process 500 for obtaining or extracting tuple information from the incoming packet (i.e., from the incoming Ethernet frame EF including the special packet header SPH) and the utilization of this extracted information in combination with the filtering information stored in the CAM 106 (FIG. 1) to thereby generate the required route and drop maps as described with reference to FIG. 4.

In the process 500 receipt of the incoming packet is illustrated in step 502 and thereafter required fields from the incoming packet are extracted in step 504. This extraction of pertinent fields in the incoming packet is termed "parsing" of the incoming packet and will be described in more detail below with reference to FIGS. 6 and 7. Thus, the hardware implementing the DS IP filter 104 includes a parser or parsing circuitry (these terms will be used interchangeably herein) for extracting the pertinent fields of the incoming packet. Once these fields have been extracted in step 504, they are applied to a CAM 506 where the CAM 506 corresponds to the CAM 106 of FIG. 1. The CAM 506 receives control signals from the parsing circuitry extracting the pertinent fields (tuples) from the incoming packet and in response to these control signals the CAM performs the appropriate type of filtering using the extracted fields. The control signals control the CAM 506 to perform DSG, LLC, or IP filtering, and/or IP routing of the packet.

When the CAM 506 finds a "hit" for the desired extracted fields of the incoming packet, the CAM outputs the corresponding route map or drop map as indicated in step 508. In addition, the CAM 506 indicates that a hit has occurred and controls a multiplexing function in step 510 responsive to whether a hit has occurred or not occurred. More specifically, when the CAM 506 indicates no hit has occurred (i.e., information from the parsed or extracted fields did not match in the CAM) then the multiplexing function of step 510 outputs a default route map or a default drop map as the route map or drop map output from the filtering operation in step 514. Conversely, when the CAM 506 indicates a hit has occurred then the multiplexing function of step 510 outputs the route map or drop map provided by the CAM in step 508 as the route add or drop map from the filtering operation in step 514.

As mentioned above, the DS IP filter 104 of FIGS. 1-3 is implemented in hardware to enable filtering to operate at the line rate of the incoming Ethernet frames EF or packets. Therefore, although FIGS. 4 and 5 are presented in the form of flow charts or flow diagrams that are normally associated with sequential steps of a program executing on suitable processing circuitry, these flow diagrams are not meant to indicate that the illustrated operations occur sequentially. In fact, many of the functional operations illustrated in these figures may occur simultaneously or nearly simultaneously in the hardware implementing the DS IP filter 104. These flow diagrams of FIGS. 4 and 5 are presented merely to illustrate the functional operation of the DS IP filter 104 and to aid in the understanding of this operation.

Figure 6:
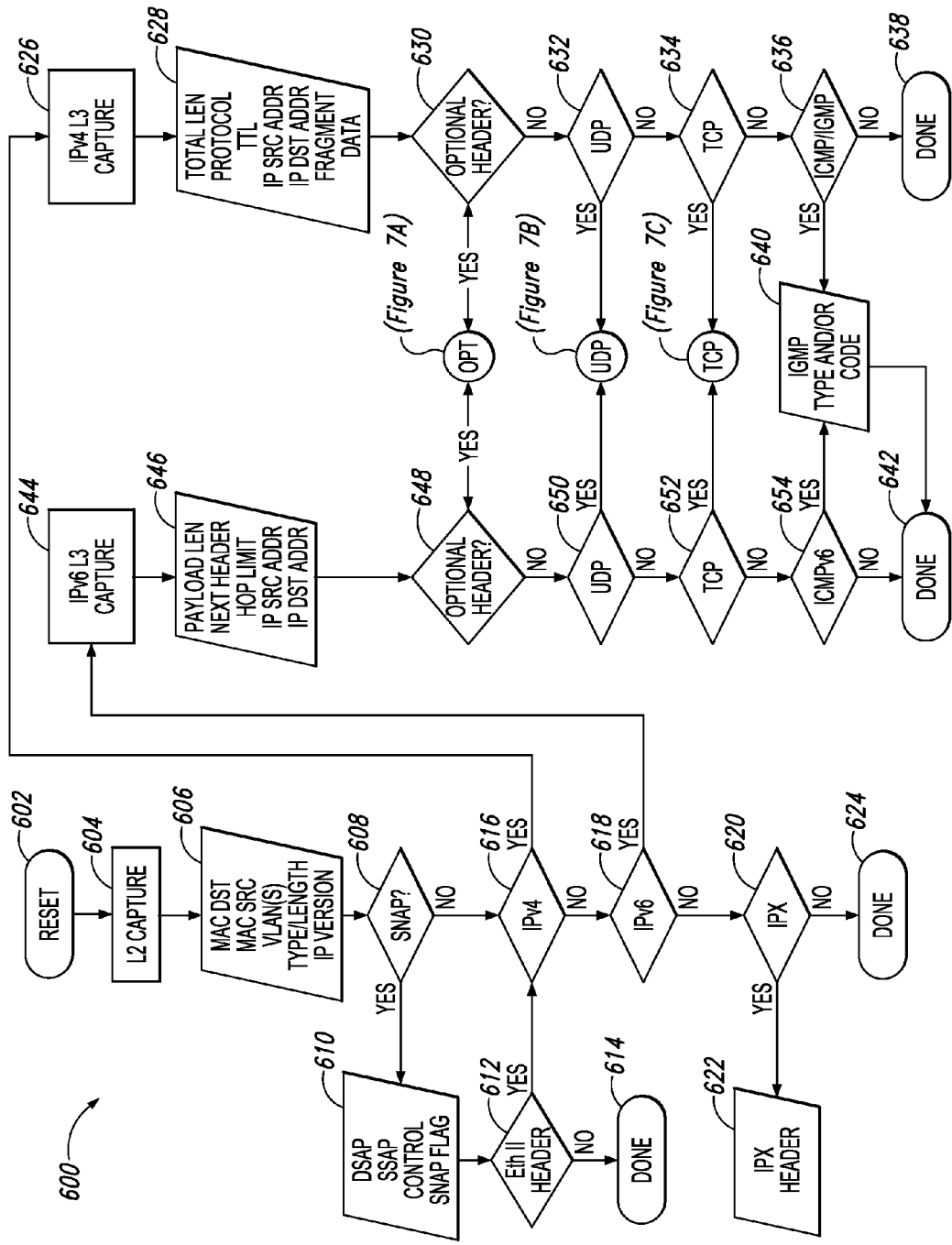
FIGS. 6 and 7A-C are flow diagrams illustrating in more detail the operation of the parser circuitry of FIG. 5 that is contained in the downstream IP filter of FIGS. 1 and 2.
Figure 7:
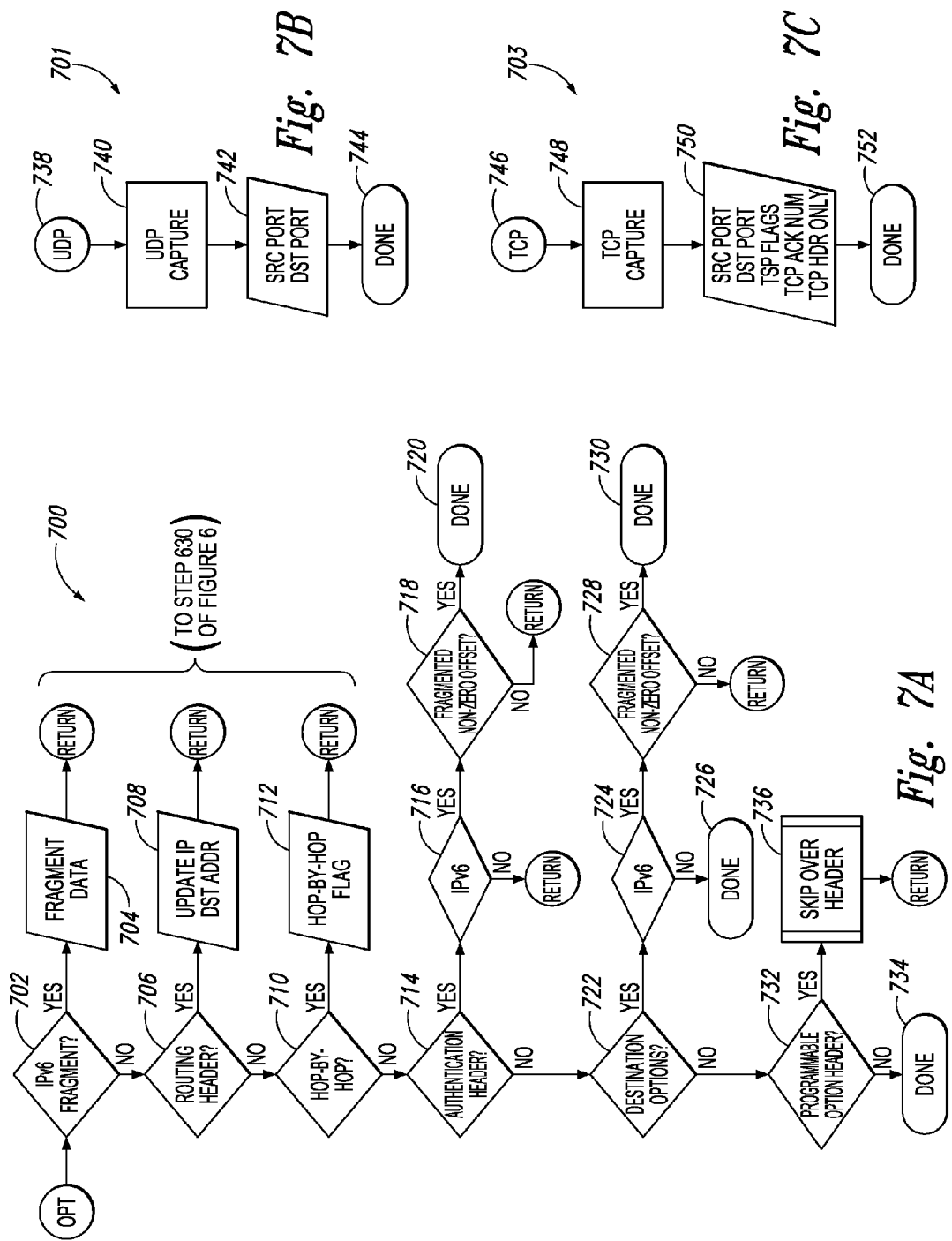

FIGS. 6 and 7A-7C are flow diagrams illustrating in more detail the operation of the parser circuitry of FIG. 5 that is contained in the DS IP filter 104 of FIGS. 1 and 2. FIG. 6 illustrates the extraction or parsing operations performed by the parser or parsing circuitry in step 504 of FIG. 5. The process 600 illustrated in FIG. 6 begins in step 602 with the receipt of an incoming Ethernet frame EF. The parsing circuitry (step 504 of FIG. 5) then begins in step 604 a level 2 (L2) extraction or capture of the pertinent fields in the EF frame. Recall, level L2 corresponds to the Data Link Layer (L2) of the OSI model. Thus, beginning in step 604 the parsing circuitry starts parsing fields of the EF frame to extract or capture level L2 data from these fields. More specifically, the parsing circuitry initially parses the EF frame to capture the fields indicated in step 606. More specifically, the parsing circuitry captures a media access control (MAC) source address MAC_src and a MAC destination address MSC_dst from the EF frame. Each device such as a cable modem CM has a unique MAC address and thus this captured information indicates the device that sent the current EF frame and the device that is to receive the EF frame. The additional fields of the EF frame indicated in step 606 are also captured. More specifically, the parsing circuitry captures the VLAN field (IEEE 802.1q frames), type or length field (depending on whether the frame is a Ethernet II or IEEE 802.3 frame), and field information indicating the version of the IP protocol (IP version) encapsulating the payload portion of the EF frame. Once the parsing circuitry has captured the fields in step 606 the process goes to step 608 and determines whether the protocol of the payload of the current Ethernet frame EF is utilizing the Subnetwork Access Protocol (SNAP) protocol. When the determination in step 608 is positive, indicating the SNAP protocol is being utilized the process goes to step 610 and the parsing circuitry extracts from the EF frame a destination service access point (DSAP), source service access point (SSAP), control and SNAP flag information from the appropriate fields of the EF frame corresponding to the SNAP protocol. The process then goes to step 612 and determines whether the current Ethernet frame EF encapsulating the SNAP protocol packet is an Ethernet II frame. When the determination in step 612 is negative, meaning the current EF frame is not an Ethernet II frame, the parsing circuitry is done parsing the incoming EF frame and the process goes to step 614 and terminates. At this point, the parsing circuitry provides the information from the extracted fields for the SNAP protocol packet determined in step 610 to the CAM 106 (FIG. 1) for filtering of the EF frame.

When the determination in step 612 is positive, this indicates the current Ethernet frame includes an Ethernet II header. In this situation, the process goes to step 616 and the parsing circuitry extracts appropriate fields from the Ethernet II frame to determine whether the protocol encapsulating the payload of the frame is IPv4 (i.e., Internet Protocol Version 4). If the determination in step 616 is negative, then the IP protocol being utilized in the current EF frame is not the IPv4 protocol and the process goes to step 618 and determines whether the protocol encapsulating the payload portion of the frame is IPv6 (i.e., Internet Protocol Version 6). The IPv4 and IPv6 are widely used protocols and thus the parsing circuitry checks for these protocols in the incoming EF frames. If the packet also is not utilizing the IPv6 protocol, the process goes to step 620 and determines whether the packet is utilizing the Internet Packet Exchange (IPX) protocol. When this is true, the determination in step 620 is positive and the process goes to step 622 and extracts the IPX header from the packet, with this header then being provided to the CAM 106 for filtering of the IPX packet. The process goes to step 624 and ends, meaning the current EF frame has been parsed and the required information provide the CAM 106 or the protocol of the encapsulated packet is not recognized (determination in step 620 is negative).

Note that step 624 is only one possible end to the process 600. Address Resolution Protocol (ARP), multiple VLANs (IEEE 802.1ad and IEEE 802.1ah frames), and Point-to-Point Protocol over Ethernet (PPPoE) are just some examples of additional data that may be extracted from downstream Ethernet frames EF using different embodiments of the parser in step 624.

Returning now to step 616, when the determination in this step is positive the packet encapsulate in the current frame is an IPv4 packet. At this point, the process goes to step 628 and begins extracting or capturing pertinent fields of the IPv4 packet in the current EF frame. Note this is termed level 3 or "L3" capture since the IP protocols are present in the Network Layer (layer or level 3) of the OSI model. The process goes from step 626 to step 628 and the parsing circuitry extracts the indicated fields from the IPv4 packet. This information includes a total length field indicating the length of the IPv4 packet, the protocol field indicating the upper-level protocol (e.g., TCP, UDP, etc.) encapsulating the data or payload portion of the IPv4 packet, the time-to-live (TTL) field, IP source (IP_Src) and IP destination (IP_Dst) addresses, and a fragment field that allows fragmented upper-level packets to be reassembled. Other embodiments of the parser capture the header checksum for analysis.

The process then goes to step 630 and the parsing circuitry determines whether the IPv4 packet includes an optional header. When the parsing circuitry determines that the current IPv4 packet includes such an optional header, the determination in step 630 is positive and the parsing circuitry executes an optional header parsing process 700 shown in FIG. 7A and which will be described in more detail below with reference to this figure. When the determination in step 630 is negative (packet includes no optional header) and after the optional header parsing process 700 of FIG. 7A has been performed when the determination in step 630 is positive, the process goes to step 632 and determines whether the upper-level protocol encapsulated in the present IPv4 packet is the user datagram protocol (UDP). When the determination in step 632 is positive, the parsing circuitry executes a UDP parsing process as illustrated in FIG. 7B and as will be described in more detail below with reference to this figure.

When the determination in step 632 is negative, indicating the present IPv4 packet does not encapsulate a UDP packet, the process goes to step 634 and determines whether the upper-level protocol encapsulated in the present IPv4 packet is the Transmission Control Protocol (TCP). When the determination in step 632 is positive, the parsing circuitry executes a TCP parsing process as illustrated in FIG. 7C and as will be described in more detail below with reference to this figure. If the determination in step 634 is negative the present IPv4 packet does not encapsulate a TCP packet and the process goes to step 636 and determines whether the present packet encapsulates an Internet Control Message Protocol (ICMP) or Internet Group Management Protocol (IGMP) packet.

When the parsing circuitry detects no ICMP or IGMP packet in step 636, the process goes to step 638 and terminates. However, this is just one embodiment of the parser. Additional protocols such as layer two tunneling protocol (L2TP) and IPv6 in IPv4 tunneling protocols are but two examples of additional protocols parsed by various embodiments of the parser. In this situation, no valid protocol encapsulated in the present IPv4 packet was found and the DS IP filter 104 (FIG. 1) passes the information extracted to the filter for a suitable programmed action, such as dropping the present EF frame or sending it to a queue for examination by a processor. Conversely, when the determination in step 636 indicates the present IPv4 packet includes an ICMP or IGMP packet, the process goes to step 640 and captures an IGMP type and or code for the packet. The process then goes to step 642 and terminates, meaning the captured type or code will then be provided to the CAM 106 (FIG. 1) for filtering of the present packet.

Returning now to step 618, when the determination in this step is positive this indicates that the current EF frame encapsulates an IPv6 packet. At this point, the parsing circuitry then executes level 3 (L3) capture of required fields in this IPv6 packet as indicated at step 644 in FIG. 6. To perform this extraction or capture, the parsing circuitry executes steps 646-654 that are analogous to step 628-636 previously described with reference to the L3 extraction or capture for an IPv4 packet. Accordingly, for the sake of brevity the steps 646-654 will not be described in more detail herein but will be understood by those skilled in the art from the prior description of step 628-636.

Referring now to FIG. 7A, the optional header parsing process 700 will now be described in more detail. Recall, this process is executed when the parsing circuitry determines through its L3 capture of either an IPv4 or IPv6 packet that the packet includes an optional header. In this situation, the parsing circuitry must parse the IPv4 or IPv6 packet containing the optional header differently to extract or capture the required field values. The optional header parsing process 700 begins in step 702 and the process determines whether the IPv4 or IPv6 packet being parsed includes IPv6 fragment data indicating whether the present IPv6 packet is a fragment (only an IPv6 packet would of course include such data). If the determination is step 702 is positive, the process goes to step 704 and the pertinent fragment data is extracted from the IPv6 packet. The process then returns to step 630 in FIG. 6 for continued parsing as previously described. If more optional headers are present, it returns to the optional header processing in step 700. If not, The captured fragment data from step 704 is supplied to the CAM 106 and utilized in filtering the present IPv6 packet.

If the determination in step 702 is negative, the parsing circuitry goes to step 706 and determines whether the current packet includes a routing header. When the packet includes a routing header, the parsing circuitry goes to step 708 and updates the IP destination address (IP_Dst) of the packet based on this routing information if programmed to do so. The process then returns to step 630 in FIG. 6 for continued parsing as previously described. If the packet includes no routing header, the determination in step 706 is negative and the process goes to step 710 and parses the IP packet to determine whether the packet includes a hop-by-hop header. If the parsing circuit determines the IP packet includes such a hop-by hop header the process goes to step 712 and the parsing circuit sets a hop-by-hop flag for use by a processor during subsequent processing of the packet. From step 712 the process then returns to step 630 in FIG. 6 for continued parsing as previously described.

When the determination in step 710 is negative, the process goes to step 714 and the parsing circuit determines whether the IP packet includes an authentication header, where the authentication header is a security-related field that may be present in the IP packet. From step 714 the process goes to step 716 and the parsing circuitry determines whether the IP packet being processed is an IPv6 packet. If the current IP packet being processed is not an IPv6 packet the determination in step 716 is negative in the process once again returns to step 630 of FIG. 6 for continued parsing as previously described. Where the current IP packet is an IPv6 packet the determination step 716 is positive and the process goes to step 718 and determines whether a non-zero fragmented offset field is present in the packet, with this offset being later utilized in reassembling fragmented packets. If the determination in step 718 is negative indicating no non-zero offset is present the process once again returns to step 630 of FIG. 6 for continued parsing as previously described. The capture of the non-zero offset step 718 results in the process going to step 720 and terminating, where at this point the captured values from the current IP packet are supplied to the CAM 106 (FIG. 1) for filtering of the packet.

If no authentication header is found in step 714, the parsing circuitry goes to step 722 and determines whether a destination options field in the IP packet is set. If such a destination options field is set in the current IP packet the determination in step 722 is positive and the process goes to step 724 and determines whether the packet is an IPv6 packet. If the packet is not an IPv6 packet the determination in step 724 is negative and the process goes to step 726 and terminates. If the packet is an IPv6 packet the determination step 724 is positive and the parsing circuitry goes to step 728 and determines whether a non-zero fragment offset is present in the packet. If no such offset is present, the process returns to step 630 of FIG. 6 for continued parsing of the packet as previously described. Conversely, if a non-zero fragment offset is detected in step 728 the process goes to step 730 and terminates and at this point the parsed values from the current IP packet are supplied to the CAM 106 (FIG. 1) for filtering of the packet.

Finally, if the determination in step 722 indicates no destination options are present in the current IP packet the process goes to step 732 and the parsing circuitry determines whether a programmable option header is present in the current IP packet. Programmable options are built into the parser for future expansion and contain details of how to calculate the length of the optional header for skipping over it. If no such programmable option header is captured then an unknown option is found and the process goes to step 734 and terminates. The captured protocol or next header from the current IP packet is provided to the CAM 106. If step 732 determines a programmable option header is present in the current IP packet, this header is skipped over in step 736 and the process then returns to step 630 of FIG. 6 for continued parsing of the packet as previously described.

Multiple options may be found in an Ethernet frame. In these cases, the optional header processing is re-entered multiple times. After returning from processing one option, process 7A is re-entered for additional options. Each option may cause additional information to be extracted for processing by the CAM 106.

FIG. 7B illustrates the UDP parsing process 701 according to one embodiment of this process. Recall, the parsing circuitry executes the process 702 when the current IP packet includes a UDP packet. The process 701 begins in step 738 and goes immediately to step 740 where the detected UDP packet is captured and then in step 742 the parsing circuitry captures a source port Src_Port and a destination port Dst_Port from the UDP packet and then goes to step 744 and terminates. At this point the parsed information from the UDP packet is provided to the CAM 106 for filtering of this packet. Other embodiments of the parser capture the UDP checksum and verify it is correct for IPv6 frames and IPv4 frames where it is non-zero.

FIG. 7C illustrates the TCP parsing process 703 according to one embodiment of this process. Recall, the parsing circuitry executes the process 703 when the current IP packet includes a TCP packet. The process 703 begins in step 746 and goes immediately to step 748 where the detected TCP packet is captured and then in step 750 the parsing circuitry captures a source port Src_Port, destination port Dst_Port, TCP flags, TCP acknowledgment number and a TCP header from the TCP packet, and then goes to step 752 and terminates. At this point the parsed information from the TCP packet is provided to the CAM 106 for filtering of this packet. Other embodiments of the parser capture and check the checksum.

Figure 8:
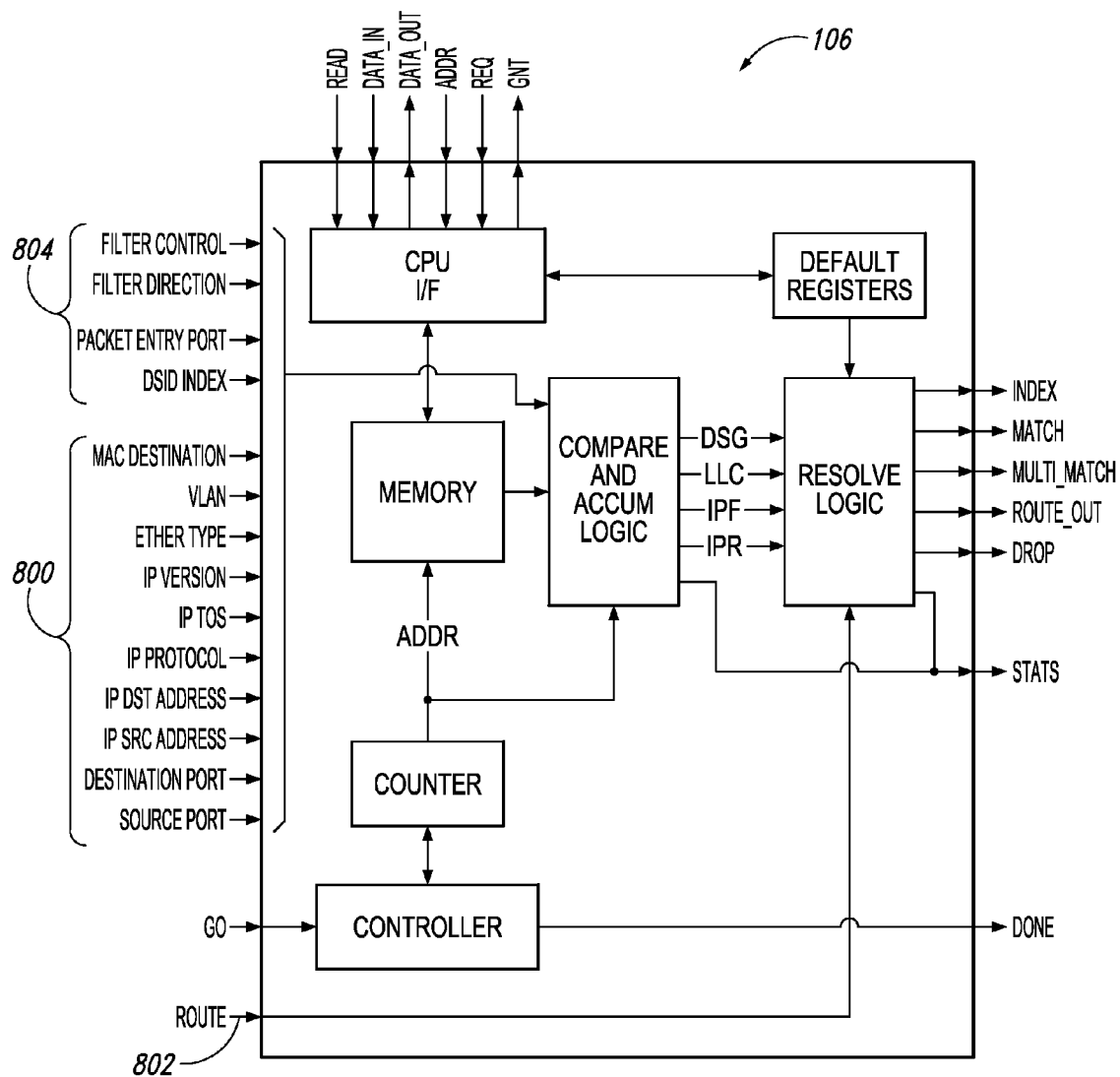
FIG. 8 is a functional block diagram of the shared CAM of FIG. 1 according to one embodiment of the subject matter disclosed in the present application.

FIG. 8 is a functional block diagram of the shared CAM 106 of FIG. 1 according to one embodiment of the subject matter disclosed in the present application. The shared CAM 106 has multiple inputs and outputs that allow the CAM to operate to process multiple packets simultaneously. The CAM 106 receives all the parsed fields 800 that were captured from the packet by the parsing circuitry or parser (step 504 of FIG. 5). In addition, the CAM 106 receives the route map from the special packet header SPH that is appended to the incoming Ethernet frame EF as previously described above with reference to FIG. 2 and Table 1. This route map is designated 802 in FIG. 8. The CAM 106 also receives control signals 804 from the packet processing circuitry 107. In operation, the CAM 106 "walks" or examines each storage location in its memory, where each memory location contains the same fields and these fields can be programmed to match a portion or all of the field values of the incoming packets and each location includes routing information, type of filter, and whether or not to drop routes for the packet, as will be described in more detail below.

The system contains many management information base (MIB) statistics that are calculated based on the filtering performed by the DS IP filter 104. These MIBs keep detailed statistics on the hits for each filter. These statistics are not simply that the CAM 106 entry for that location hit, but are more detailed. For example, if the egress filter 204 had a hit on CAM entries 1, 4, and 5, but the entry route map 432 along with the drops from CAM entry 1 and 4 create a final map having none of the destinations that entry 5 would remove, only entries 1 and 4 would have their hit counter updated. Entry 5 would not increment as it contributed nothing towards the final route map. Table entries in the CAM 106 are prioritized. Those lower in the CAM 106 have priority over those higher in the CAM.

In one embodiment, the IP filter 104 supports 288 CAM hit counters and 3 octet counts detailing the number of bytes that enter, leave, or are dropped by the system. These are updated after each filtering operation. The octet counters are all 64-bit and increment by the number of bytes in the Ethernet frame associated with the count in one embodiment. A detailed list of counters is available in EDCS-890465, "HB Docsis3 Memory Map and Register Spec".

Both upstream and downstream IP filters in the bridges 112, 102, parse the incoming frames EF sending the extracted fields to the CAM 106. This CAM 106 is made up of traditional memories and controller as shown in FIG. 8. It is a pseudo CAM as it takes multiple clock cycles to determine if there was a hit. Other embodiments of the system use traditional one cycle CAMs in the implementation.

The CAM 106 receives control signals entering with the packet. These control signals let it know what kind of filtering to do. The four control signals are DSG, LLC, IP filter, and IP route. These are generated in a MAC filtering stage, or are applied to injected packets. The first three fields (DSG, LLC, and IP filter) are used to drop frame routing destinations. The fourth, IP route, is used to add route destinations to the frame.

The CAM 106 in one embodiment is broken into two pieces, and ingress piece and an egress piece. The two pieces work independently of each other. There are 192 filters in the ingress piece of the CAM 106 and 64 filters in the egress piece of the CAM in one embodiment. The memories used to store filter entries are 32 entries deep this embodiment, resulting in 6 memory modules (or banks) to store the ingress filters and 2 memory modules (or banks) to store the egress filters. When the CAM 106 is searched, memory banks are read in parallel to accelerate the CAM search, resulting in a search time of approximately 32 clocks. In one embodiment, filter entries are arranged sequentially across the memory banks as illustrated below:

TABLE 4

CAM Memory layout

| | Ingress filters | | | | | | Egress filters | |
|---|---|---|---|---|---|---|---|---|
| | Bank 0 | Bank 1 | Bank 2 | Bank 3 | Bank 4 | Bank 5 | Bank 0 | Bank 1 |
| Row 0 | 0 | 1 | 2 | 3 | 4 | 5 | 0 | 1 |
| Row 1 | 6 | 7 | 8 | 9 | 10 | 11 | 2 | 3 |
| ... | | | | | | | | |
| Row 31 | 186 | 187 | 188 | 189 | 190 | 191 | 62 | 63 |

The egress CAM piece can filter on the routing determined by the ingress CAM piece. The ingress CAM piece houses DSG, LLC, and IP filter and route functions. Packets that have the "ingress" bit set are processed by this filter. The egress CAM performs IP filtering functions. This CAM operates on any packet that has the "Egress" bit set. In one embodiment, the two filters (ingress and egress) are pipelined. The ingress can begin working on a second packet while the egress filter starts works on the first packet.

The shared CAM 106 has multiple inputs and outputs as seen in the simplified block diagram of FIG. 8. This allows the CAM 106 to process multiple Ethernet frames EF or packets simultaneously. This is needed to maintain line rate of both upstream and downstream data flows. The CAM 106 receives all parsed and processed fields for a given packet and "walks" through its memory locations to identify hits. Each memory location contains the same fields. These can be programmed to match a portion or all of the incoming data contained in the incoming packets. Routing information, type of filter, and whether or not to drop routes are programmed into each memory location. Some entries such as the source port SRC_port, or destination port DST_port are compared to verify they are within a range. As the memory is traversed, the results of each entry are accumulated. Four specific rules are kept for each type of filter (DSG, LLC, IP filter, and IP route). If any filter matches and the drop route bit is set, the CAM 106 will signal to drop the packet route to that destination. It only takes one filter entry to signal a drop. Even if other entries match and do not have the drop route bit programmed, the one that signals the drop route will cause the route to be dropped from that logical port. The DSG, LLC, and IP filters have priority over the IP route filter. While it is envisioned that each of the four filter types will be programmed in their own group of entries, the CAM 106 does not require this. Each type of filter may be programmed in any entry location. Each entry has an associated valid and continue bit associated with it. These control general flow. If an entry is no longer needed, the valid can be deasserted and the filter will skip this entry as it processes. If at any time a valid entry matches but the continue bit is deasserted, the CAM 106 will stop processing within that filter type (DSG, LLC, IP filter, and IP Route) and return with the results found up to and including that entry.

One of the programmed fields is routing. On a match, the routing information is ORed with previous matches. Multiple destinations may be specified by a single entry. Over multiple entries multiple destinations may also be selected through the ORing function. As data enters, it is examined. If no routes are selected, a CPU written register provides a default route map. This can be left as 0 to keep things as is, or the CPU can add one or more routes as a starting point. See FIG. 8 for details. Each type of filter (DSG, LLC, and IP) knows if a miss happened in the CAM 106. If a miss occurred, and the incoming flags on the data specified that filter, a default register is provided. This CPU programmed register can specify one or more routes to drop on a miss. When the filter finishes processing all filter entries, it compiles the information into the final outputs. This happens in the "Resolve Logic" block seen in FIG. 8.

During the filter operation, statistics are being kept. These are used to update MIBs counters. Each filter location has a counter associated with it. Every contributing match is recorded. The index of the first match is sent out with the results in the SPH. The location of the second match can also be recorded in some circumstances. If multiple matches occur, the multi-match output is asserted.

In one embodiment, the 192 ingress filter entries are searched in order, from entry 0 through entry 191, regardless of the filter type (DSD/LLC/IP) of each entry. However, for the purposes of counting the number of hits at each filter entry, the control logic imposes the following order among filter types: DSG=>LLC=>IP. For instance, if an LLC filter at index 100 resulted in a dropped frame (all routes cleared), then an IP filter at index 90 would not be counted as a hit, regardless of whether the incoming frame matched that filter location.

One skilled in the art will understand that even though various embodiments and advantages of the subject matter disclosed in the present application have been set forth in the foregoing description, the above disclosure is illustrative only, and changes may be made in detail, and yet remain within the broad principles of the invention. For example, components described above may in some instances be implemented using digital circuitry and also, where appropriate, may be realized through software executing on suitable processing circuitry, or a combination of both. It should also be noted that the functions performed by components in the functional block and flow diagrams may be combined to be performed by fewer elements depending upon the actual components used in the DOCSIS system being implemented. Therefore, the present disclosure is to be limited only by the appended claims.

What is claimed is:
1. An electronic device, comprising:
a specialized content addressable memory configured to store filter information that is utilized in filtering upstream and downstream Ethernet frames;
a downstream bridge circuit coupled to the specialized content addressable memory, the downstream bridge circuit including hardware circuitry operable to parse downstream Ethernet frames to obtain parsed information from these downstream Ethernet frames and to route and filter the downstream Ethernet frames based on this parsed information and the filter information stored in the specialized content addressable memory;
an upstream bridge circuit coupled to the specialized content addressable memory, the upstream bridge circuit including hardware circuitry operable to parse upstream Ethernet frames to obtain parsed information from these upstream Ethernet frames and to route and filter the upstream Ethernet frames based on this parsed information and the filter information stored in the specialized content addressable memory; and
wherein the downstream bridge circuit includes a downstream IP filter implemented entirely in hardware circuitry, the downstream IP filter configured to filter and route the downstream Ethernet frames based on the contents of fields extracted from the Ethernet frames and from higher level packets encapsulated in the Ethernet frames, and on the filter information stored in the specialized content addressable memory.

2. The electronic device of claim 1, wherein the downstream IP filter comprises:
a pre-CAM filter configured to extract commonly utilized fields in each downstream Ethernet frame and to filter the Ethernet frame based on the values of these extracted fields;
an ingress filter coupled to the pre-CAM filter to receive filtered Ethernet frames from the pre-CAM filter and configured to extract fields from these Ethernet frames to perform DOCSIS Set-top gateway (DSG) filtering, Link Level Control (LLC) filtering, Internet Protocol (IP) filtering and IP routing filtering on the Ethernet frames from the pre-CAM filter; and
an egress filter coupled to the ingress filter and configured to extract fields from the Ethernet frames from the ingress filter and to modify routing of the Ethernet frames when the extracted fields of the Ethernet frames have specified values.

3. The electronic device of claim 2, wherein the pre-CAM filter comprises a second specialized content addressable memory.

4. The electronic device of claim 3, wherein the commonly utilized fields comprise the Ethernet type field and the frame-type field.

5. The electronic device of claim 4, wherein the pre-CAM filter is configured to drop an Ethernet frame or to set subsequent filtering and routing to be performed on the Ethernet frame when the pre-CAM filter determines the value contained in the extracted fields is contained in the second specialized content addressable memory.

6. The electronic device of claim 5, wherein the pre-CAM filter is configured to set subsequent filtering and routing by enabling or disabling subsequent egress, DOCSIS Set-top gateway (DSG), Link Level Control (LLC), Internet protocol (IP) and IP routing filtering of the Ethernet frame.

7. The electronic device of claim 2, wherein the ingress filter further comprises:
a DOCSIS Set-top gateway (DSG) filter configured to classify packets encapsulated by the Ethernet frames into different DSG data streams;
a Link Level Control (LLC) filter configured to filter Ethernet frames based on Data Link Layer information in the fields of the packet encapsulated in the Ethernet frame;
an IP filter configured to filter Ethernet frames based on Network Layer and Transport Layer protocol information in the fields of the packet encapsulated in the Ethernet frame; and
an IP routing filter configured to modify the routing of the Ethernet frames based on the fields of the packet encapsulated in the Ethernet frame.

8. The electronic device of claim 7, wherein the DSG filter, LLC filter, and IP filter are configured to drop routing destinations from selected downstream Ethernet frames and the IP routing filter is configured to add routing destinations to selected Ethernet frames.

9. The electronic device of claim 8, wherein the ingress filter is configured to give precedence to the determinations of the DSG, LLC, and IP filters to drop routing destinations over determinations by the IP routing filter to add routing destinations.

10. An electronic device, comprising:
an upstream bridge configured to perform IP filtering on incoming Ethernet frames, the upstream bridge comprising:
a specialized content-addressable memory configured to store filtering information; and hardware IP filters coupled to the specialized content-addressable memory, the hardware IP filters configured to extract frame information from the Ethernet frames and to route and filter the incoming Ethernet packets responsive to the extracted routing and frame information and the filtering information of the content-addressable memory;

wherein the hardware IP filters comprise:
- a pre-CAM filter configured to extract commonly utilized fields in each downstream Ethernet frame and to filter the Ethernet frame based on the values of these extracted fields;
- an ingress filter coupled to the pre-CAM filter to receive filtered Ethernet frames from the pre-CAM filter and configured to extract fields from these Ethernet frames to perform DOCSIS Set-top gateway (DSG) filtering, Link Level Control (LLC) filtering, Internet Protocol (IP) filtering and IP routing filtering on the Ethernet frames from the pre-CAM filter; and
- an egress filter coupled to the ingress filter and configured to extract fields from the Ethernet frames from the ingress filter and to modify routing of the Ethernet frames when the extracted fields of the Ethernet frames have specified values.

11. The electronic device of claim 10,
wherein each Ethernet frame includes a special packet header that includes a route map containing routing information for the Ethernet frame, and
wherein the ingress filter is configured to extract the route map and provide an ingress default route map when the extracted route map has a specified value.

12. The electronic device of claim 11,
wherein the IP routing filter is operable to generate a route map for the Ethernet frame, and
wherein the ingress filter is configured to apply the route map generated by the IP routing filter to modify the ingress default route map.

13. The electronic device of claim 12,
wherein each of the DSG, LLC and IP filters is operable to generate a corresponding drop map indicating destinations of the Ethernet frame that are to be dropped, and
wherein the ingress filter is configured to apply the drop maps generated by the DSG, LLC, and IP filters to further modify the ingress default route map as modified by the route map from the IP routing filter to thereby generate an ingress exit route map.

14. The electronic device of claim 13,
wherein the egress filter is configured to generate an egress IP drop map indicating additional destinations of the Ethernet frame that are to be dropped, and
wherein the egress filter is further configured to apply the egress IP drop map to the ingress exit route map to thereby generate an egress exit route map that is placed in the special packet header and forwarded with the frame according to the egress exit route map.

15. An electronic device, comprising:
a downstream bridge configured to perform IP filtering on incoming Ethernet frames, the downstream bridge comprising:
a hardware IP filter adapted to receive filtering information from a specialized content-addressable memory, the hardware IP filter including an IP parser configured to extract tuple information from the Ethernet frames and to route and filter the incoming Ethernet frames responsive to the extracted tuple information, and configured to generate statistics to convey information on the filtering and routing of Ethernet frames being performed; and
wherein the IP parser comprises hardware circuitry configured to extract the tuple information in the form of selected fields from the incoming Ethernet frames.

16. The electronic device of claim 15, wherein the IP parser is configured to perform extraction of level 2 (L2), level 3 (L3), and level 4 (L4) fields from each Ethernet frame and the packet encapsulated therein.

17. The electronic device of claim 16, wherein the hardware IP filter is configured to filter multiple Ethernet frames in parallel.

18. The electronic device of claim 17, wherein the IP parser is configured to extract level 2 (L2) fields from the Ethernet frame to determine whether the packet encapsulated in the Ethernet frame is one of a SNAP, IPv4, IPv6, and IPX packet.

\* \* \* \* \*